United States Patent
Santos et al.

(10) Patent No.: US 11,574,253 B2
(45) Date of Patent: Feb. 7, 2023

(54) DISTRIBUTED TRAINING FOR DEEP LEARNING MODELS

(71) Applicant: Microsoft Technology Licensing, LLC, Redmond, WA (US)

(72) Inventors: Ivo José Garcia dos Santos, Kirkland, WA (US); Mehdi Aghagolzadeh, Kirkland, WA (US); Rihui Peng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 16/529,223

(22) Filed: Aug. 1, 2019

(65) Prior Publication Data

US 2021/0035027 A1 Feb. 4, 2021

(51) Int. Cl.
*G06N 20/20* (2019.01)
*G06N 3/04* (2006.01)
*G06N 3/08* (2006.01)

(52) U.S. Cl.
CPC .................................. *G06N 20/20* (2019.01)

(58) Field of Classification Search
CPC ...... G06N 20/20; G06N 3/0454; G06N 3/084; G06N 20/00
See application file for complete search history.

(56) References Cited

U.S. PATENT DOCUMENTS

2015/0019214 A1* 1/2015 Wang .................. G06N 3/02
704/232

OTHER PUBLICATIONS

Goyal, et al., "Accurate, Large Minibatch SGD: Training ImageNet in 1 Hour", In Repository of arXiv:1706.02677v1, Jun. 8, 2017, 12 Pages.
Lin, et al., "Don't Use Large Mini-Batches, Use Local SGD", In Repository of arXiv:1808.07217v4, Feb. 5, 2019, 30 Pages.
"International Search Report, and Written Opinion issued in PCT Application No. PCT/US2020/036800", dated Sep. 18, 2020, 28 Pages.
"Office Action Issued in European Patent Application No. 20750512.4", dated Nov. 15, 2022, 4 Pages.

* cited by examiner

*Primary Examiner* — Shirley X Zhang
(74) *Attorney, Agent, or Firm* — Schwegman Lundberg & Woessner. P.A.

(57) ABSTRACT

A computer implemented method trains distributed sets of machine learning models by training each of the distributed machine learning models on different subsets of a set of training data, performing a first layer model synchronization operation in a first layer for each set of machine learning models, wherein each model synchronization operation in the first layer generates first updates for each of the machine learning models in each respective set, updating the machine learning models based on the first updates, performing a second layer model synchronization operation in a second layer for first supersets of the machine learning models wherein each model synchronization in the second layer generates second updates for updating each of the machine learning models in the first supersets based on the second updates such that each machine learning model in a respective first superset is the same.

20 Claims, 7 Drawing Sheets

DISTRIBUTED TRAINING FOR DEEP LEARNING MODELS

BACKGROUND

Training of machine learning models can take a significant amount of time. Very large sets of training data are used to accurately train a model. One approach to train models faster includes the use of distributed learning, where multiple copies of a model are trained in parallel on processors using the training data. It can be difficult to efficiently synchronize the models that are trained on the parallel processors.

SUMMARY

A computer implemented method trains distributed sets of machine learning models by training each of the distributed machine learning models on different subsets of a set of training data, performing a first layer model synchronization operation in a first layer for each set of machine learning models, wherein each model synchronization operation in the first layer generates first updates for each of the machine learning models in each respective set, updating the machine learning models based on the first updates, performing a second layer model synchronization operation in a second layer for first supersets of the machine learning models, wherein each first superset comprises different sets of machine learning models, and wherein each model synchronization in the second layer generates second updates for each of the machine learning models in each respective first superset, and updating each of the machine learning models in the first supersets based on the second updates such that each machine learning model in a respective first superset is the same.

DETAILED DESCRIPTION

Figure 1:
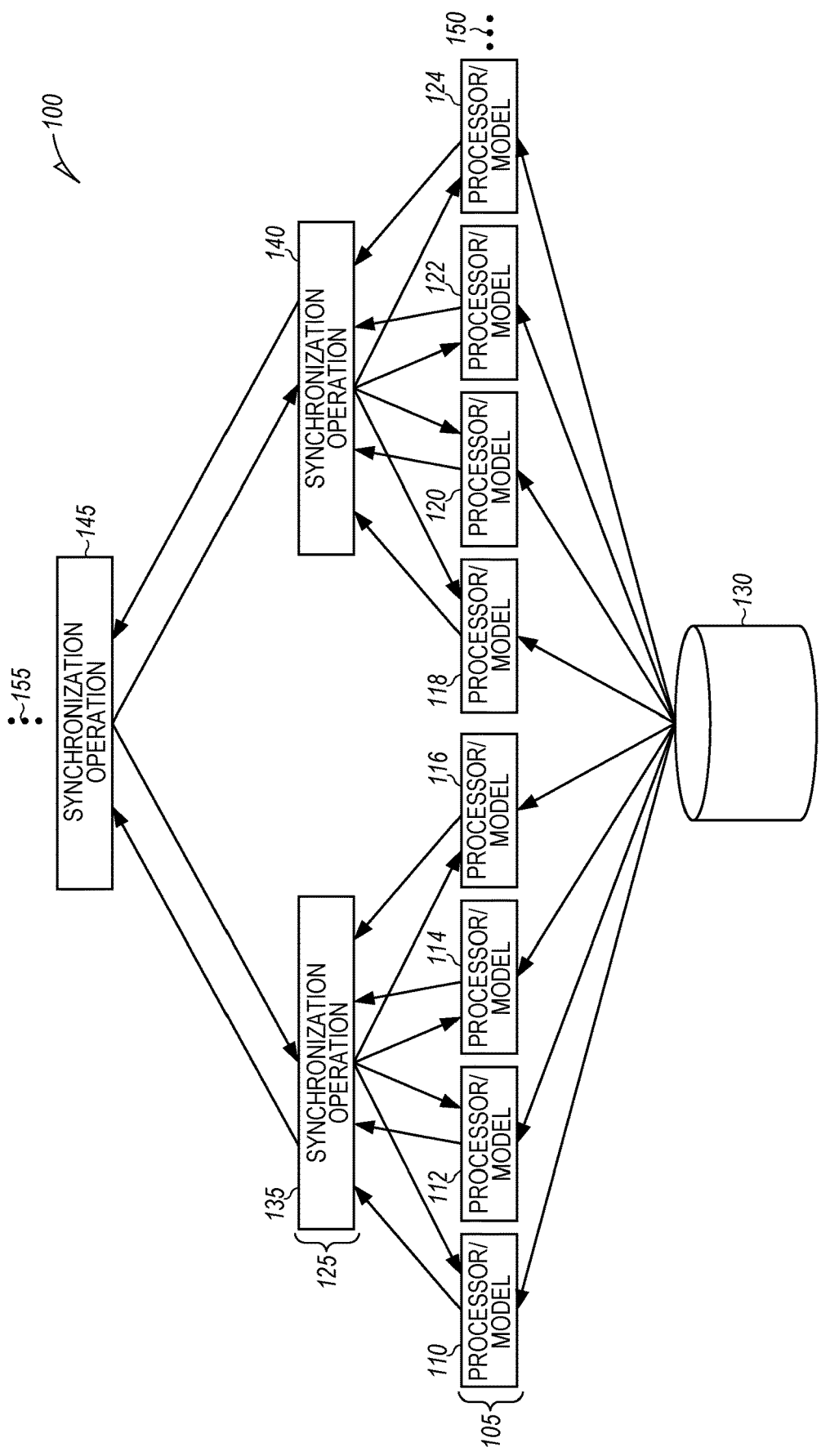
FIG. 1 is a block diagram of a distributed hierarchical system for training deep learning models according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Training of machine learning models can take a significant amount of time. Very large training sets of data are used to accurately train a model. One approach to train models faster includes the use of distributed learning, where multiple models are trained in parallel on processors using the training data and are combined to form a single model.

The performance and scalability of distributed learning with a large number of processors, referred to as workers, depends on the quality and frequency of synchronization among its workers. The synchronization cost, however, is not homogeneous, being heavily dependent on the topology of the network and on the speed of the interconnects both intra-node and inter-node.

A novel hierarchical (multi-layer) grouped aggregation system provides for different synchronization strategies to be built on top of each other. Lower layers of processors used to train replica models have typically faster interconnects between smaller groups of processors with more frequent synchronizations of the models within each group. The lower layers work in favor of convergence of the model. Upper layers may have slower interconnects between larger sets of processors, but are updated less frequently. The upper layers provide greater scalability by performing less frequent updates on the upper layers. By being aware of the topology of the interconnections between processors, the layers may be formed with groups of processors using the fastest available links. Models may thus be trained faster utilizing a larger number of processors operating in parallel.

FIG. 1 is a block diagram of a distributed hierarchical system 100 for training deep learning models according to an example embodiment. A first layer 105 includes a plurality of processors 110, 112, 114, 116, 118, 120, 122, and 124 are used to train a deep learning model based on training data 130. The training data may include thousands if not millions or billions of samples for use in training. Speech related training sets for example, can easily result in billions of samples. Image related training sets can also result in a large number of samples. Training a single model on a single processor would be very time consuming.

In one embodiment, the training data may be partitioned and then divided into batches, also referred to as subsets, of training data. Each processor may then receive samples of the training data from a respective partition for use in training replica models. The term replica model or models is used to describe that all the processors in one embodiment are training the same type of model, and that the models are synchronized at one or more points in time such that they are the same. Thus, the models may be trained using different data, but the parameters of the model, such as weights between nodes in the models will all be made equal in response to synchronization.

In one embodiment, each processor, such as a graphics processing unit (GPU) or other type of processor, such as a central processing unit, is trained on a batch of data from the processors' respective partition of the training data 130. The number of samples in a batch may vary based on the particular application for which the resulting models is being trained. In one example, the number of samples in a batch may range from 2000 to 5000 samples. In further examples, the number of samples in a batch may ranges from hundreds to many thousands.

Following processing of the respective batches of samples by the processors 110-124, a synchronization in a second layer 125 that includes second layer synchronization points 135 and 140 may be performed. In one embodiment, the second layer synchronization point 135 is used to synchronize the models trained by processors 110, 112, 114, and 116, comprising a first set of processors. The synchronization is performed to set the parameter of each of the models to the same values. Typical synchronization algorithms include an all-reduce function which is an algorithm that can be used to combine gradients. Others include simply using an average of the parameters from the different models. Some synchronization algorithms may use a function related to the direction that parameters are trending. Any synchronization algorithm may be used in various embodiments.

Second layer synchronization point 140 is used to synchronize the models trained by processors 118, 120, 122, and 124, comprising a second set of processors. The synchronization algorithm used within a layer is the same for each of the sets of processors. The same synchronization algorithm may be used in each of the layers, or a different algorithm may be used for different layers. In one embodiment, the synchronization algorithm used in the second layer is the same as that used by synchronization point 135. Thus, following synchronization of the models for each set of processors, each model in the first set will be the same, and each model in the second set will be the same. However, the models in the different sets likely have different sets of parameters. Processing of multiple batches of samples may be performed, with synchronization of the models on the respective sets of processor occurring as above.

In one embodiment, the synchronization operations are performed in cooperation by all the processors in each set with one of the processors, or a separate processor being designated a parameter server to calculate the replica model parameters and broadcast or otherwise provides the replica model parameters to the other processors in the set.

After a preselected number of batches of samples have been processed, a third layer 145 may be used to synchronize the models in the first and second sets of processors. The synchronization algorithm used in the third layer may be the same or different than that used in the second layer 125. In effect, the frequency of synchronization by the second layer 125 occurs more frequently than the synchronization performed in the third layer. This difference in synchronization frequency alleviates a bottleneck that can result by trying to synchronize each model with all the other models frequently. Connection speeds are fastest in the first layer, such that more frequent synchronization can occur more efficiently. However, the higher the layer, and there may be more than three layers in some embodiments, usually the slower the connection speed. By synchronizing less frequently at higher layers, the slower connection speed is used less frequently, reducing the delay that would be encountered by attempting to synchronize all the models frequently.

The third layer synchronization algorithm utilizes a processor, either one of the processors in the set or a separate parameter server processor, that receives parameters from one processor in each set, calculates the replica model parameters and broadcasts or otherwise provides the replica model parameters to the other processors in the set.

While two sets of processors and three layers are shown and described above, in further embodiments, there may be many more sets of processors and synchronization points within the various layers as indicated at 150, as well as further layers as indicated at 155.

Figure 2:
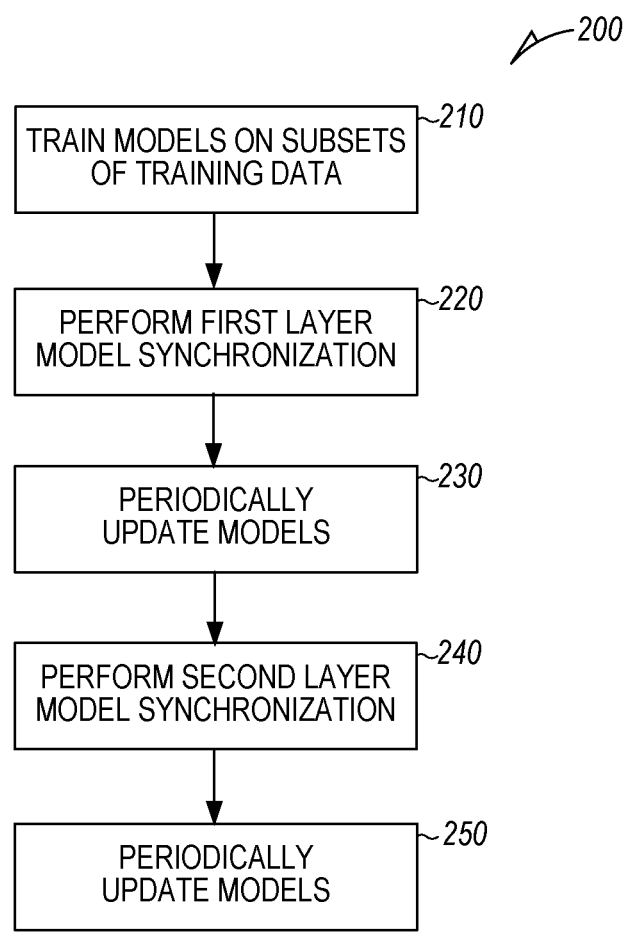
FIG. 2 is a flowchart illustrating a method of training deep learning models according to an example embodiment.

FIG. 2 is a flowchart illustrating a method 200 of training sets of deep learning models according to an example embodiment. At operation 210, each of the distributed machine learning models are trained on different subsets, such as batches of a set of training data. The batches may be part of respective partition of the set of training data, wherein each partition corresponds to a different processor. Thus, each of the models is trained on different samples of the training data.

A first layer model synchronization operation 220 is performed in a first layer for each set of machine learning models, wherein each model synchronization operation in the first layer generates first updates for each of the machine learning models in each respective set. The machine learning models in each set are updated at operation 230 based on the first updates. Updates may occur by broadcasting the new parameter values to the processors with models to be updated. Note that each of the models in respective sets will be the same following update, but the sets may each have a different replica model, as they were trained on different data. In one embodiment, training may continue for several batches, such as 20, with first updates being generated and applied.

A second layer model synchronization operation 240 is performed in a second layer for a first superset of machine learning models, wherein each model synchronization in the second layer generates second updates for each of the machine learning models in the first superset. Note that the second updates may be generated following one or more first updates being generated in response to batches being processed. In one embodiment, 50 such first updates may trigger a second update. In response to the generation of the second updates, each of the machine learning models is updated at operation 240 based on the second updates such that each machine learning model in the first superset is the same.

In one embodiment, processing ends when the last batches of training data has been processed. In further embodiments, processing may end in response to a determination being made the models have converged, or learning has stopped, and prior to overfitting of each other.

In one embodiment, a third layer model synchronization operation in a third layer is performed for second supersets of machine learning models, wherein each model synchronization in the third layer generates third updates for each of the machine learning models in each respective second superset. Each of the machine learning models based on the third updates such that each machine learning model is the same, wherein the first layer model synchronization operation occurs more frequently than second layer model synchronization operations and the second layer model synchronization operations occur more frequently than the third layer model synchronization operations.

Note that the superset may include all the processors and corresponding models, or one or more additional layers with corresponding second or higher supersets may be used in further embodiments, with each layer synchronizing larger numbers of models until all the models are replicas.

In one embodiment, the first and second model synchronization operations 220 and 240 further include communicating the computed gradients to a processor and computing a mean of the computed gradients by the processor. The models may be updated based on the mean of the computed gradients. In one embodiment, the first layer model synchronization operation occurs more frequently than second layer model synchronization operations.

In one embodiment model training and synchronization is performed on distributed processors, wherein communication connections between processors in the first layer are faster than communication connections between the first and second layers. In one embodiment, the second layer synchronization operation generates the second updates based on communication with one machine learning model from each subset. The one machine learning model may be selected based on the processor having the fastest connection to the second layer which corresponds to the lowest communication latency to the second layer.

Note that the frequency of updates at each of the layers was previously described as every 20 batches for the first layer and every 50 first updates for the second layer. Such frequencies may be different in further embodiments, and may even be modified between updates, such as to facilitate faster convergence of the replica model or better accuracy of the replica model and may also be dependent upon the type of application for which the replica model is being trained or the speed of the networks connecting each of the layers.

In one embodiment, each of the layers may utilize one or more processors for the synchronization points. The processors may be different from those that are training the models, or may utilize one or more of the processors that are also used to train the models. In such a case, the layers are logical layers that include actual communication connections between the processors to ensure that the processors used to synchronize in the various layers can obtain data needed to perform the synchronization and to broadcast the synchronization data to the processors that are training the models to be updated.

Figure 3:
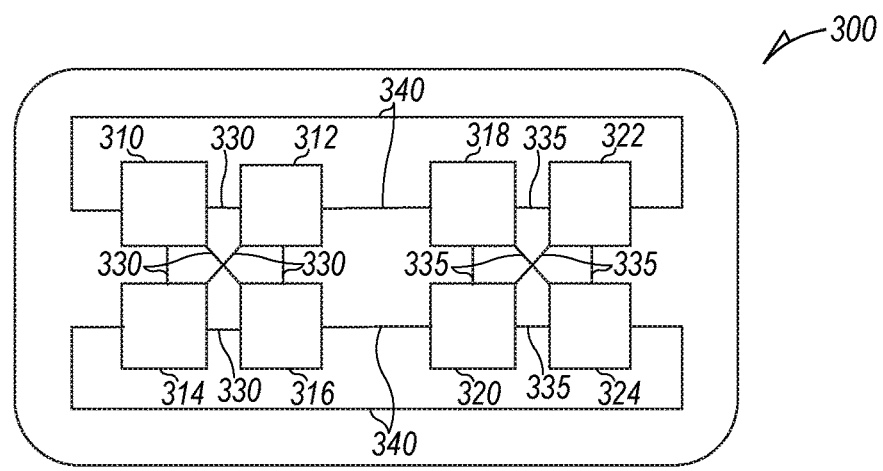
FIG. 3 is a block diagram of an eight-way processing module for use in a first layer of the distributed hierarchical system according to an example embodiment.

FIG. 3 is a block diagram of an eight-way processing module 300 for use in a first layer of a distributed hierarchical system according to an example embodiment. Module 300 includes eight processors 310, 312, 314, 316, 318, 320, 322, and 324 coupled via a high-speed connections and forming one set of processors in the first layer. In one embodiment, the connections may be made using NVLink. NVLink is a wire-based communications protocol for near-range semiconductor communications developed by Nvidia for use in data and control code transfers in processor systems between CPUs and GPUs and solely between GPUs. NVLink specifies point-to-point connections with data rates of 20 and 25 Gbit/s (v1.0/v2.0) per data lane per direction. Other interconnects that provide fast data transfer between processors may be used in further embodiments.

Processors 310, 312, 314, and 316 are each directly connected to each other by communication interconnects 330, and may be referred to as a first group. Similarly, processors 318, 320, 322, and 324 are each directly connected to each other by communication interconnect 335 and may be referred to as a second group. The groups are connected by three further communication interconnects indicated at 340, which directly connects processor 312 with processor 318, processor 316 with processor 320, processor 310 with processor 322, and processor 314 with processor 324. In one embodiment, the eight-way processor module 300 forms one set of processors to be trained on batches from a partition of training data for such set of processors. The models on each of the processors in the set are synchronized after each batch has been processed.

Figure 4:
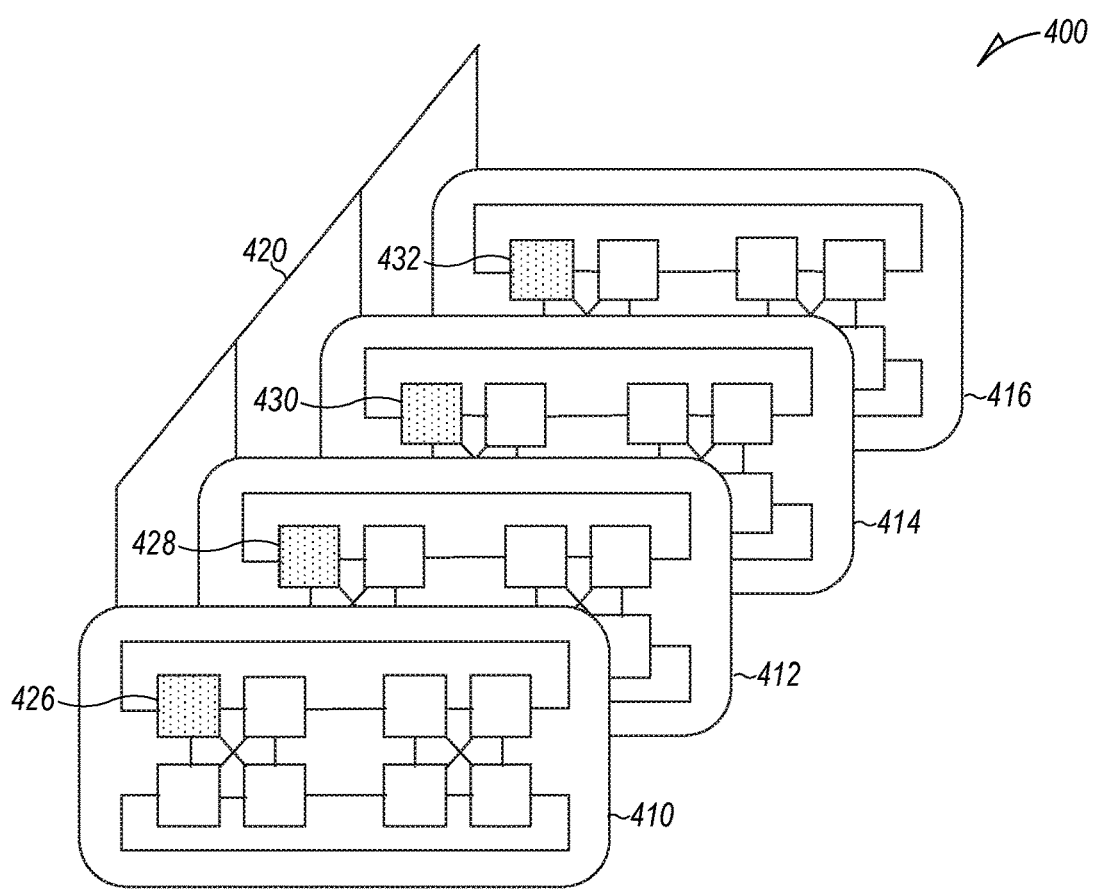
FIG. 4 is a block diagram of a second layer of the distributed hierarchical system according to an example embodiment.

FIG. 4 is a block diagram 400 illustrating a second layer of the distributed hierarchical system according to an example embodiment. Four modules 410, 412, 414, and 416, comprising sets of processors having a configuration similar to that of module 300, are shown coupled via a communication interconnect 420. In one embodiment, interconnect 420 is a slower interconnect than the interconnects within the modules. One example interconnect 420 comprises NCCL (Nvidia collective communications library) that provides routines such as all-reduce, broadcast, reduce, reduce-scatter and other functions.

The second layer interconnect 420 is used to synchronize the models from each of the four modules 410, 412, 414, and 416. Since each of the modules have already synchronized the models within them, interconnect 420 may communicate with one processor from each module, as indicated by four processors 426, 428, 430, and 432. The processor from each module may be selected to minimize communication latency in one embodiment.

Figure 5:
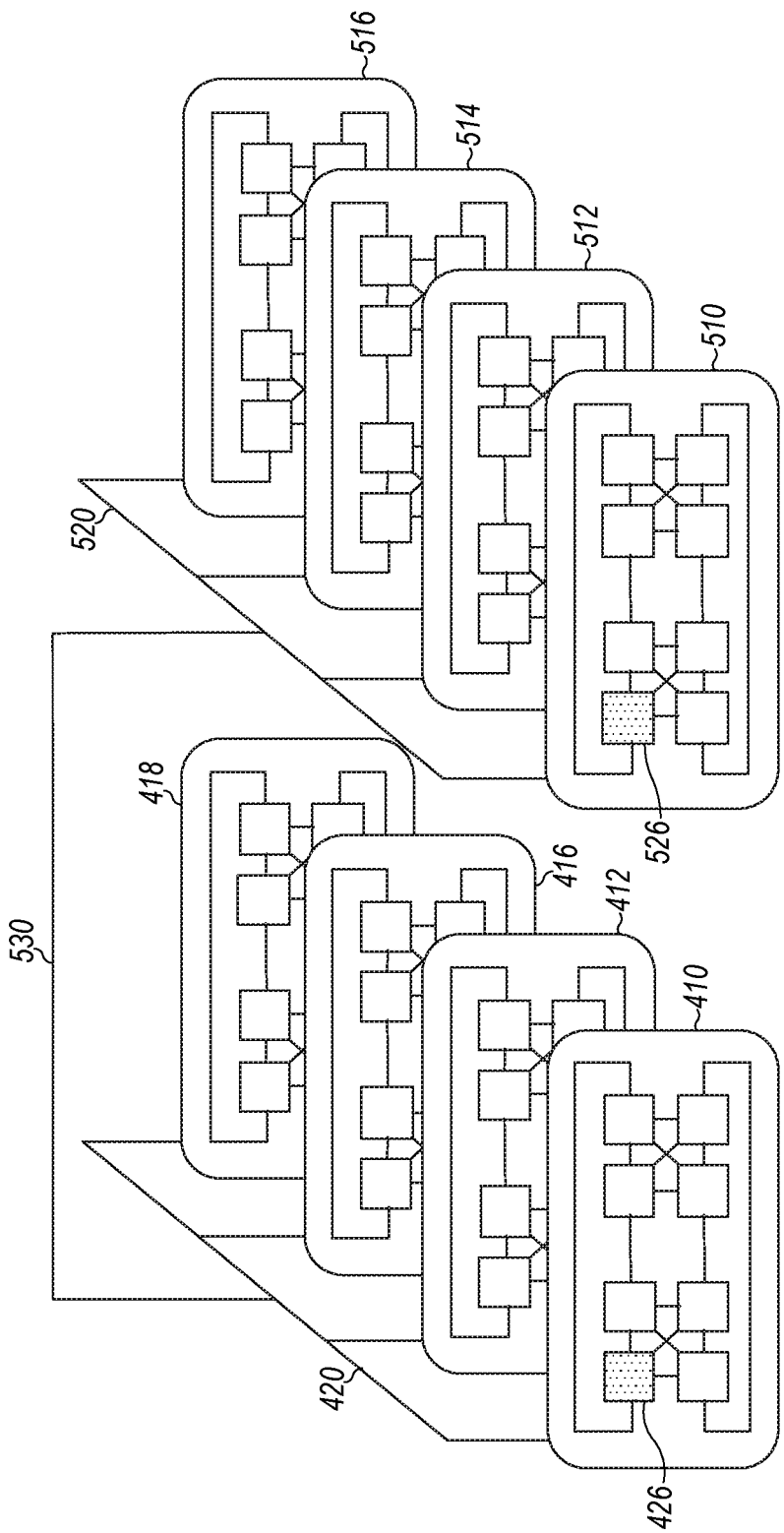
FIG. 5 is block diagram of a third layer of the distributed hierarchical system according to an example embodiment.

FIG. 5 is block diagram 500 illustrating a third layer of the distributed hierarchical system according to an example embodiment. Two sets of modules are illustrated, including the set of modules 410, 412, 416, and 418 as illustrated in FIG. 4 and a further set of modules 510, 512, 514, and 516 having a second layer interconnect 520 which synchronizes all the processors in such set of modules. A processor 526 in the further set of modules contains the replica model for such set following synchronization. The third layer comprises an interconnect 530 that receives a model from each of the sets of modules via processors 426 and 526. Interconnect 530 synchronizes the models and broadcasts parameters for the replica model such that each processor in the sets of modules contains the same replica model.

Figure 6:
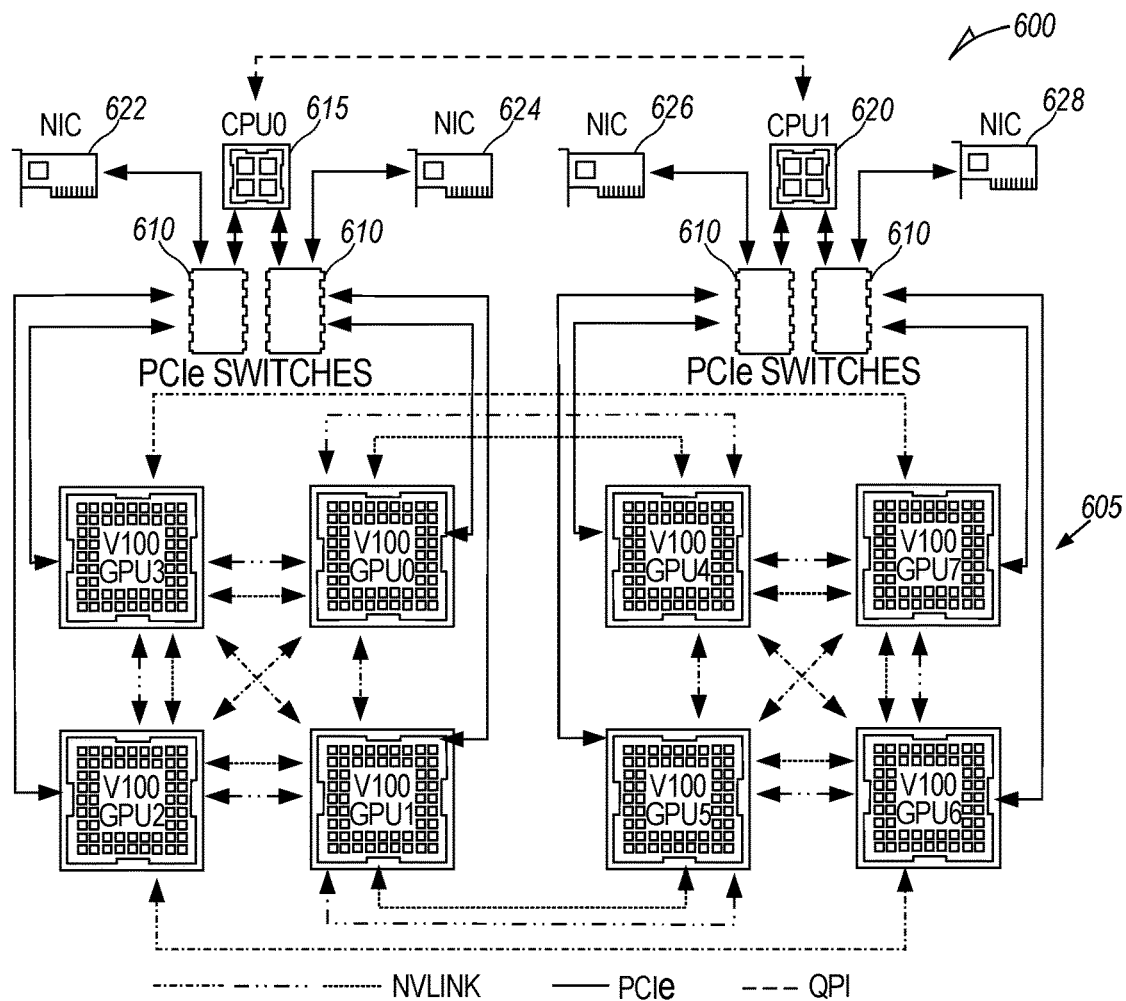
FIG. 6 is a block diagram illustrating communication links in an eight-way processing module including switches and coupled to network interface cards according to an example embodiment.
Figure 7:
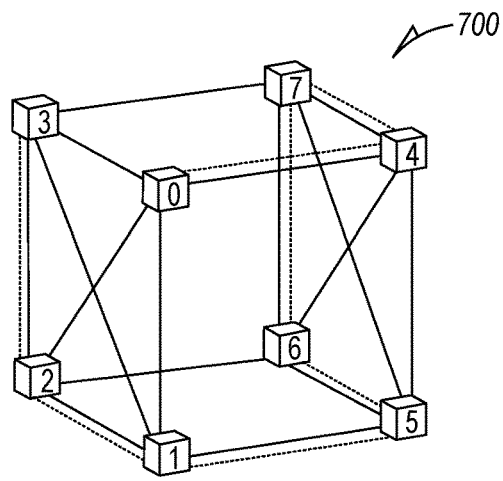
FIG. 7 is a block diagram illustrating communication links in an eight-way processing cube according to an example embodiment.

FIG. 6 is a block diagram illustrating an NVLink topology 600 in an example eight-way processing module 605 including switches 610, CPU0 615, CPU1 620, and network interface cards (NIC) indicated at 622, 624, 626, and 628 that couples the module 605 to other modules via higher layers. The interconnects between the module's processors are also illustrated and are similar to those described with respect to module 300 in FIG. 3. Since the interconnects between the modules, such as NVLinks do not route signals, the switches 610 are used for routing signals. In one example embodiment, the switches 610 comprises PCIe (peripheral component interconnect express), a communication bus standard. Other topologies for other types of modules providing fast interconnects between processors in the modules and that have the ability to communicate with other modules may be used in further embodiments FIG. 7 is a block diagram illustrating communication links in an eight-way processing cube 700 according to an example embodiment. Cube 700 in one embodiment corresponds to module 605, and is a convenient shorthand way to represent the processors and interconnects in module 605. The following figures utilize the cube based shorthand representation of modules to illustrate various pairings of processors to form sets of processors for a first layer. Cube 700 represents eight processors that form a set for the first layer.

Figure 8:
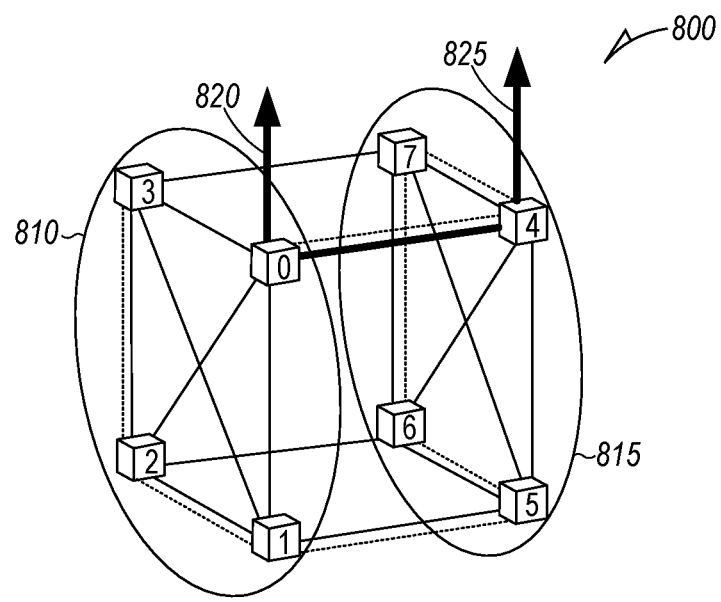
FIG. 8 is a block diagram illustrating smart grouping of processors in an eight-way processing cube according to an example embodiment.

FIG. 8 is a block diagram illustrating smart grouping of processors in an eight-way processing cube 800 according to an example embodiment. Cube 800 represents two sets of four processors that may be used in the first layer. A first set of processors is represented by circle 810 and a second set is represented by circle 815. Interconnects 820 and 825 may be used to connect to the second layer for synchronization of the sets to form fully connected halves of processors of the module and form upper layers.

Figure 9:
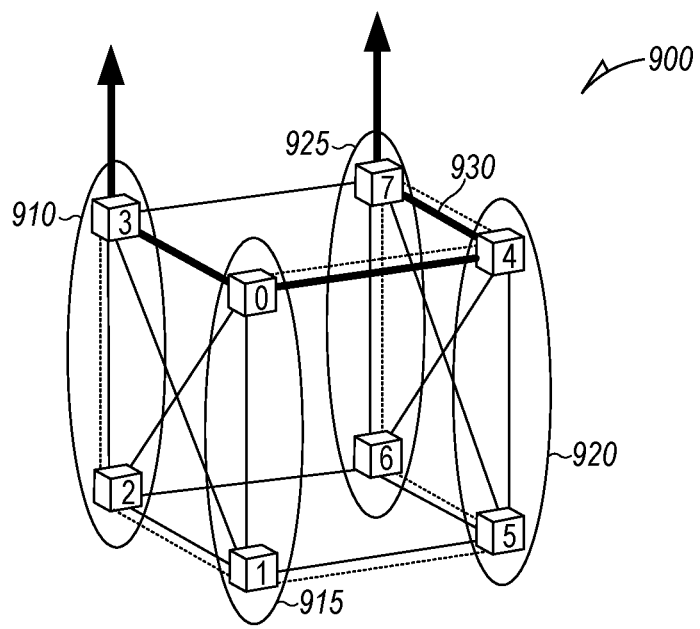
FIG. 9 is a block diagram illustrating an alternative smart grouping of processors in an eight-way processing cube according to an example embodiment.

FIG. 9 is a block diagram illustrating an alternative smart grouping of processors in an eight-way processing cube 900 according to an example embodiment. Cube 900 represents four sets of two processors that may be used in the first layer. The sets are represented by ovals 910, 915, 920, and 925 with interconnects 930 used to synchronize the sets and form connected pairs of processors and to form upper layers.

Figure 10:
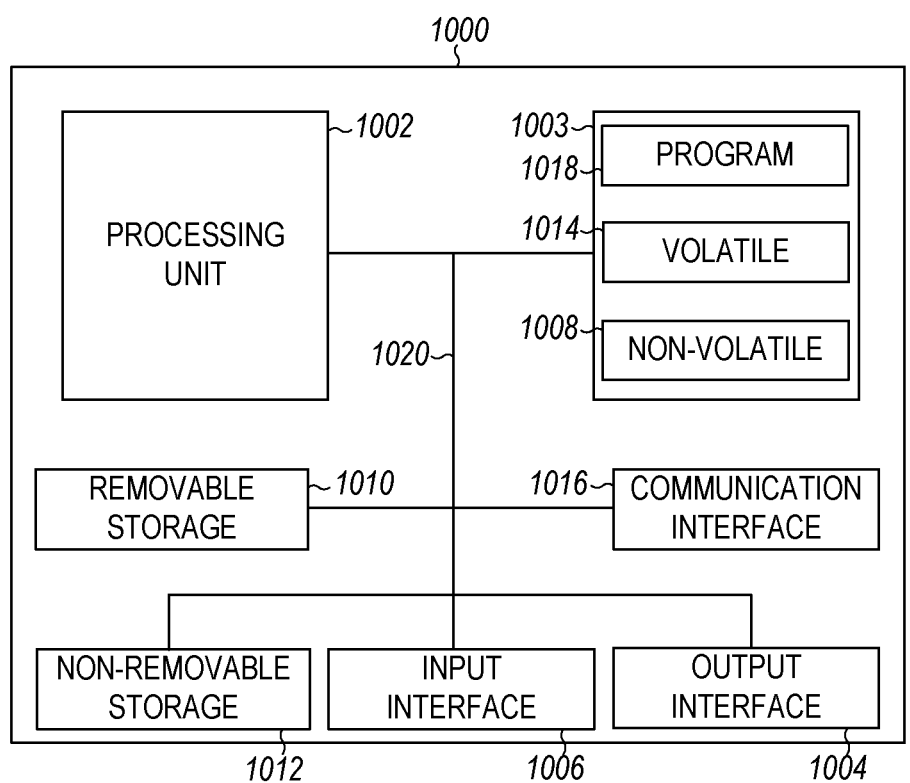
FIG. 10 is a block schematic diagram of a computer system to implement one or more example embodiments.

FIG. 10 is a block schematic diagram of a computer system 1000 to implement various processing units used to train machine learning models in a distributed manner and for performing methods and algorithms according to example embodiments. All components need not be used in various embodiments.

One example of a computing device in the form of a computer 1000 may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, smart storage device (SSD), or other computing device including the same or similar elements as illustrated and described with regard to FIG. 10. Devices, such as smartphones, tablets, and smartwatches, are generally collectively referred to as mobile devices or user equipment.

Although the various data storage elements are illustrated as part of the computer 1000, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1003 may include volatile memory 1014 and non-volatile memory 1008. Computer 1000 may include— or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 1000 may include or have access to a computing environment that includes input interface 1006, output interface 1004, and a communication interface 1016. Output interface 1004 may include a display device, such as a touchscreen, that also may serve as an input device. The input interface 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1000 are connected with a system bus 1020.

Computer-readable instructions stored on a computer-readable medium are executable by the processing unit 1002 of the computer 1000, such as a program 1018. The program 1018 in some embodiments comprises software to implement one or more CPUs, GPUs, or other processors for training models in a distributed manner as described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1018 may be used to cause processing unit 1002 to perform one or more methods or algorithms described herein.

EXAMPLES

1. A computer implemented method trains distributed sets of machine learning models by training each of the distributed machine learning models on different subsets of a set of training data, performing a first layer model synchronization operation in a first layer for each set of machine learning models, wherein each model synchronization operation in the first layer generates first updates for each of the machine learning models in each respective set, updating the machine learning models based on the first updates, performing a second layer model synchronization operation in a second layer for first supersets of the machine learning models, wherein each first superset comprises different sets of machine learning models, and wherein each model synchronization in the second layer generates second updates for each of the machine learning models in each respective first superset, and updating each of the machine learning models in the first supersets based on the second updates such that each machine learning model in a respective first superset is the same.

2. The method of example 1 wherein the first and second model synchronization operations each comprise combining gradients of loss from the respective sets and supersets of machine learning models.

3. The method of example 2 wherein the first and second model synchronization operations each further comprise computing a mean of the computed gradients and wherein the models in respective sets and supersets are updated based on the mean of the computed gradients.

4. The method of any of examples 1-3 wherein the second layer model synchronization operation obtains a copy of parameters of the model that is updated based on the first updates from a processor having a lowest latency connection to the second layer.

5. The method of any of examples 1-4 wherein the first layer model synchronization operation occurs more frequently than second layer model synchronization operations.

6. The method of any of examples 1-5 wherein model training and synchronization is performed on distributed processors, wherein communication connections between processors in the first layer are faster than communication connections between the first and second layers.

7. The method of example 6 wherein the second layer synchronization operation generates the second updates based on communication with one machine learning model from each set of machine learning models.

8. The method of example 7 wherein the one machine learning model from each subset has the lowest communication latency to the second layer.

9. The method of any of examples 1-8 and further including performing a third layer model synchronization operation in a third layer for second supersets of machine learning models, wherein each model synchronization in the third layer generates third updates for each of the machine learning models in each respective second superset and updating each of the machine learning models based on the third updates such that each machine learning model is the same, wherein the first layer model synchronization operation occurs more frequently than second layer model synchronization operations and the second layer model synchronization operations occur more frequently than the third layer model synchronization operations.

10. A machine-readable storage device has instructions for execution by a processor of a machine to cause the processor to perform operations to perform a method of training distributed sets of machine learning models, the operations including training each of the distributed machine learning models on different subsets of a set of training data performing a first layer model synchronization operation in a first layer for each set of machine learning models, wherein each model synchronization operation in the first layer generates first updates for each of the machine learning models in each respective set, updating the machine learning models based on the first updates, performing a second layer model synchronization operation in a second layer for first supersets of the machine learning models, wherein each first superset comprises different sets of machine learning models, and wherein each model synchronization in the second layer generates second updates for each of the machine learning models in each respective first superset, and updating each of the machine learning models in the first supersets based on the second updates such that each machine learning model in a respective first superset is the same.

11. The device of example 10 wherein the first and second model synchronization operations each comprise combining gradients of loss from the respective sets and supersets of machine learning models.

12. The device of example 11 wherein the first and second model synchronization operations each further comprise: computing a mean of the computed gradients, wherein the models in respective sets and supersets are updated based on the mean of the computed gradients.

13. The device of any of examples 10-12 wherein the first layer model synchronization operation occurs more frequently than second layer model synchronization operations and wherein model training and synchronization is performed on distributed processors, wherein communication connections between processors in the first layer are faster than communication connections between the first and second layers, and wherein the second layer synchronization operation generates the second updates based on communication with one machine learning model from each set of machine learning models.

14. The device of example 13 wherein the one machine learning model from each subset has the lowest communication latency to the second layer.

15. The device of any of examples 10-14 wherein the operations further include performing a third layer model synchronization operation in a third layer for second supersets of machine learning models, wherein each model synchronization in the third layer generates third updates for each of the machine learning models in each respective second superset and updating each of the machine learning models based on the third updates such that each machine learning model is the same, wherein the first layer model synchronization operation occurs more frequently than second layer model synchronization operations and the second layer model synchronization operations occur more frequently than the third layer model synchronization operations.

16. A device includes a processor and a memory device coupled to the processor and having a program stored thereon for execution by the processor to perform operations. The operations include training each of the distributed machine learning models on different subsets of a set of training data, performing a first layer model synchronization operation in a first layer for each set of machine learning models, wherein each model synchronization operation in the first layer generates first updates for each of the machine learning models in each respective set, updating the machine learning models based on the first updates, performing a second layer model synchronization operation in a second layer for first supersets of the machine learning models, wherein each first superset comprises different sets of machine learning models, and wherein each model synchronization in the second layer generates second updates for each of the machine learning models in each respective first superset, and updating each of the machine learning models in the first supersets based on the second updates such that each machine learning model in a respective first superset is the same.

17. The device of example 16 wherein the first and second model synchronization operations each comprise combining gradients of loss from the respective sets and supersets of machine learning models.

18. The device of example 17 wherein the first and second model synchronization operations each further comprise: computing a mean of the computed gradients, wherein the models in respective sets and supersets are updated based on the mean of the computed gradients.

19. The device of any of examples 16-18 wherein the first layer model synchronization operation occurs more frequently than second layer model synchronization operations and wherein model training and synchronization is performed on distributed processors, wherein communication connections between processors in the first layer are faster than communication connections between the first and second layers, and wherein the second layer synchronization operation generates the second updates based on communication with one machine learning model from each set of machine learning models.

20. The device of example 19 wherein the one machine learning model from each subset has the lowest communication latency to the second layer and wherein the operations further include performing a third layer model synchronization operation in a third layer for second supersets of machine learning models, wherein each model synchronization in the third layer generates third updates for each of the machine learning models in each respective second superset and updating each of the machine learning models based on the third updates such that each machine learning model is the same, wherein the first layer model synchronization operation occurs more frequently than second layer model synchronization operations and the second layer model synchronization operations occur more frequently than the third layer model synchronization operations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of training distributed sets of machine learning models running on corresponding sets of distributed processors, the method comprising:
    training each of the machine learning models on different subsets of a set of training data;
    performing a first layer model synchronization operation for each respective set of the distributed sets of machine learning models, wherein each first layer model synchronization operation for each respective set generates a respective first update for each of the machine learning models in each respective set;
    updating the machine learning models of each respective set based on the respective first updates;
    performing a second layer model synchronization operation for respective first supersets of the machine learning models, wherein each respective first superset comprises different sets of the sets of distributed machine learning models, and wherein each second layer model synchronization operation generates respective second updates for each of the machine learning models in each respective first superset; and
    updating each of the machine learning models in the respective first supersets based on the respective second updates such that each machine learning model in the respective first supersets is the same.

2. The method of claim 1 wherein the first and second layer model synchronization operations each comprise combining gradients of loss of weights from the respective sets and supersets of machine learning models.

3. The method of claim 2 wherein the first and second layer model synchronization operations each further comprise computing a mean of the computed gradients and wherein the models in respective sets and supersets are updated based on the mean of the computed gradients.

4. The method of claim 1 wherein the second layer model synchronization operation obtains a copy of parameters of a model that is updated based on the first respective update from a processor having a lowest latency connection to the second layer.

5. The method of claim 1 wherein the first layer model synchronization operation occurs more frequently than second layer model synchronization operations.

6. The method of claim 1 wherein model training and synchronization is performed on distributed processors, wherein communication connections between processors training a set of models are faster than communication connections between processors training a different set of models.

7. The method of claim 6 wherein the second layer synchronization operation generates the second updates based on communication with one machine learning model from each set of machine learning models.

8. The method of claim 7 wherein the one machine learning model from each subset has the lowest communication latency to the second layer model synchronization operation.

9. The method of claim 1 and further comprising:
    performing a third layer model synchronization operation for respective second supersets of machine learning models, wherein each third layer model synchronization generates a respective third update for each of the machine learning models in each respective second superset; and
    updating each of the machine learning models of each respective second superset based on the respective third updates such that each machine learning model in a respective second superset is the same, wherein the first layer model synchronization operation occurs more frequently than second layer model synchronization operations and the second layer model synchronization operations occur more frequently than the third layer model synchronization operations.

10. A machine-readable storage device having instructions for execution by a processor of a machine to cause the processor to perform operations to perform a method of training distributed sets of machine learning models running on corresponding sets of distributed processors, the operations comprising:

training each of the machine learning models on different subsets of a set of training data;

performing a second layer model synchronization operation for respective first supersets of the machine learning models, wherein each respective first superset comprises different sets of the sets of distributed machine learning models, and wherein each second layer model synchronization operation generates respective second updates for each of the machine learning models in each respective first superset; and updating the machine learning models of each respective set based on the respective first updates;

performing a second layer model synchronization operation for respective first supersets of the machine learning models, wherein each respective first superset comprises different sets of the sets of distributed machine learning models, and wherein each second layer model synchronization operation generates respective second updates for each of the machine learning models in each respective first superset; and updating each of the machine learning models in the respective first supersets based on the respective second updates such that each machine learning model in the respective first supersets is the same.

11. The device of claim 10 wherein the first and second layer model synchronization operations each comprise combining gradients of loss from the respective sets and supersets of machine learning models.

12. The device of claim 11 wherein the first and second layer model synchronization operations each further comprise: computing a mean of the computed gradients, wherein the models in respective sets and supersets are updated based on the mean of the computed gradients.

13. The device of claim 10 wherein the first layer model synchronization operation occurs more frequently than second layer model synchronization operations, wherein communication connections between processors training a set of models are faster than communication connections between processors training a different set of models, and wherein the second layer synchronization operation generates the second updates based on communication with one machine learning model from each set of machine learning models.

14. The device of claim 13 wherein the one machine learning model from each subset has the lowest communication latency to the second layer model synchronization operation.

15. The device of claim 10 wherein the operations further comprise:

performing a third layer model synchronization operation for respective second supersets of machine learning models, wherein each third layer model synchronization generates a respective third update for each of the machine learning models in each respective second superset; and updating each of the machine learning models of each respective second superset based on the respective third updates such that each machine learning model in a respective second superset is the same, wherein the first layer model synchronization operation occurs more frequently than second layer model synchronization operations and the second layer model synchronization operations occur more frequently than the third layer model synchronization operations.

16. A device comprising:

a processor; and a memory device coupled to the processor and having a program stored thereon for execution by the processor to perform operations comprising:

training each of the machine learning models on different subsets of a set of training data;

performing a second layer model synchronization operation for respective first supersets of the machine learning models, wherein each respective first superset comprises different sets of the sets of distributed machine learning models, and wherein each second layer model synchronization operation generates respective second updates for each of the machine learning models in each respective first superset; and updating the machine learning models of each respective set based on the respective first updates;

performing a second layer model synchronization operation for respective first supersets of the machine learning models, wherein each respective first superset comprises different sets of the sets of distributed machine learning models, and wherein each second layer model synchronization operation generates respective second updates for each of the machine learning models in each respective first superset; and updating each of the machine learning models in the respective first supersets based on the respective second updates such that each machine learning model in the respective first supersets is the same.

17. The device of claim 16 wherein the first and second layer model synchronization operations each comprise combining gradients of loss of weights from the respective sets and supersets of machine learning models.

18. The device of claim 17 wherein the first and second layer model synchronization operations each further comprise: computing a mean of the computed gradients, wherein the models in respective sets and supersets are updated based on the mean of the computed gradients.

19. The device of claim 16 wherein the first layer model synchronization operation occurs more frequently than second layer model synchronization operations, wherein communication connections between processors training a set of models are faster than communication connections between processors training a different set of models, and wherein the second layer synchronization operation generates the second updates based on communication with one machine learning model from each set of machine learning models.

20. The device of claim 19 wherein the one machine learning model from each subset has the lowest communication latency to the second layer model synchronization operation and wherein the operations further comprise:

performing a third layer model synchronization operation for respective second supersets of machine learning models, wherein each third layer model synchronization generates a respective third update for each of the machine learning models in each respective second superset; and updating each of the machine learning models of each respective second superset based on the respective third updates such that each machine learning model in a respective second superset is the same, wherein the first layer model synchronization operation occurs more frequently than second layer model synchronization operations and the second layer model synchronization operations occur more frequently than the third layer model synchronization operations.

\* \* \* \* \*